US009228885B2

(12) United States Patent
Zerhusen et al.

(10) Patent No.: US 9,228,885 B2
(45) Date of Patent: Jan. 5, 2016

(54) PATIENT SUPPORT SYSTEMS AND METHODS OF USE

(71) Applicant: Hill-Rom Services, Inc., Batesville, IN (US)

(72) Inventors: Robert M. Zerhusen, Cincinnati, OH (US); James M. Allen, Batesville, IN (US); Jennifer Fearing, West Chester, OH (US); Mark Chiacchira, Lawrenceburg, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 289 days.

(21) Appl. No.: 13/798,359

(22) Filed: Mar. 13, 2013

(65) Prior Publication Data

US 2014/0124274 A1   May 8, 2014

Related U.S. Application Data

(60) Provisional application No. 61/722,663, filed on Nov. 5, 2012, provisional application No. 61/662,711, filed on Jun. 21, 2012, provisional application No. 61/663,311, filed on Jun. 22, 2012.

(51) Int. Cl.
| | |
|---|---|
| *G01G 19/44* | (2006.01) |
| *A61G 7/015* | (2006.01) |
| *A61G 7/057* | (2006.01) |
| *A61G 7/05* | (2006.01) |

(Continued)

(52) U.S. Cl.
CPC ............ *G01G 19/445* (2013.01); *A47C 27/082* (2013.01); *A47C 27/088* (2013.01); *A47C 27/10* (2013.01); *A61G 7/015* (2013.01); *A61G 7/018* (2013.01); *A61G 7/05* (2013.01); *A61G 7/05746* (2013.01); *A61G 7/05769* (2013.01); *A61G 7/05776* (2013.01); *A61G 7/16* (2013.01); *A61G 2007/0508* (2013.01); *A61G 2007/0514* (2013.01); *A61G 2007/0524* (2013.01); *A61G 2203/44* (2013.01)

(58) Field of Classification Search
CPC .................. A61G 2007/0527; A61G 2203/44; G01G 19/44; G01G 19/445
See application file for complete search history.

(56) References Cited

U.S. PATENT DOCUMENTS

| | | |
|---|---|---|
| 4,127,906 A | 12/1978 | Zur |
| 4,410,158 A | 10/1983 | Maffei |

(Continued)

FOREIGN PATENT DOCUMENTS

| | | |
|---|---|---|
| EP | 2433605 A1 | 3/2012 |
| WO | WO 88/09651 A1 | 12/1988 |

(Continued)

OTHER PUBLICATIONS

User Manual TotalCare Bed System and TotalCare Duo 2 System Hill-Rom 2007.

(Continued)

*Primary Examiner* — Peter Macchiarolo
*Assistant Examiner* — Natalie Huls
(74) *Attorney, Agent, or Firm* — Barnes & Thornburg LLP

(57) ABSTRACT

A patient support system includes a scale system, an air system, and a lift system. The patient support system also includes a control system configured to graphically communicate information about the scale system, the air system, and the lift system to a user.

14 Claims, 10 Drawing Sheets

(51) Int. Cl.
  *A47C 27/08* (2006.01)
  *A47C 27/10* (2006.01)
  *A61G 7/018* (2006.01)
  *A61G 7/16* (2006.01)

(56) References Cited

U.S. PATENT DOCUMENTS

| | | | |
|---|---|---|---|
| 4,640,485 A | | 2/1987 | Day et al. |
| 4,961,470 A | * | 10/1990 | Koerber, Sr. ............... 177/144 |
| 5,181,288 A | | 1/1993 | Heaton et al. |
| 5,403,251 A | | 4/1995 | Belsito et al. |
| 5,407,163 A | | 4/1995 | Kramer et al. |
| 5,542,138 A | | 8/1996 | Williams et al. |
| 5,611,096 A | | 3/1997 | Bartlett et al. |
| 5,664,270 A | | 9/1997 | Bell et al. |
| 5,713,856 A | | 2/1998 | Eggers et al. |
| 5,732,712 A | | 3/1998 | Adair |
| 5,771,511 A | | 6/1998 | Kummer et al. |
| 5,833,623 A | | 11/1998 | Mann et al. |
| 6,014,784 A | | 1/2000 | Taylor et al. |
| 6,146,523 A | | 11/2000 | Kenley et al. |
| 6,279,183 B1 | | 8/2001 | Kummer et al. |
| 6,339,410 B1 | | 1/2002 | Milner et al. |
| 6,352,504 B1 | | 3/2002 | Ise et al. |
| 6,353,950 B1 | | 3/2002 | Bartlett et al. |
| 6,371,123 B1 | | 4/2002 | Stark et al. |
| 6,486,792 B1 | | 11/2002 | Moster et al. |
| 6,487,735 B1 | | 12/2002 | Jacques, II et al. |
| 6,493,568 B1 | | 12/2002 | Bell et al. |
| 6,510,049 B2 | | 1/2003 | Rosen |
| 6,536,056 B1 | | 3/2003 | Vrzalik et al. |
| 6,566,833 B2 | | 5/2003 | Bartlett |
| 6,771,181 B1 | | 8/2004 | Hughen, Jr. |
| 6,781,517 B2 | | 8/2004 | Moster et al. |
| 6,829,796 B2 | | 12/2004 | Salvatini et al. |
| 7,007,330 B2 | | 3/2006 | Kuiper et al. |
| 7,033,539 B2 | | 4/2006 | Kensky et al. |
| 7,038,588 B2 | | 5/2006 | Boone et al. |
| 7,076,818 B2 | | 7/2006 | Kummer et al. |
| 7,154,397 B2 | | 12/2006 | Zerhusen et al. |
| 7,237,287 B2 | | 7/2007 | Weismiller et al. |
| 7,441,290 B1 | | 10/2008 | Flick |
| 7,506,390 B2 | | 3/2009 | Dixon et al. |
| 7,679,520 B2 | | 3/2010 | Zerhusen et al. |
| 7,779,493 B2 | | 8/2010 | Lemire et al. |
| 7,926,131 B2 | | 4/2011 | Menkedick |
| 8,006,332 B2 | | 8/2011 | Lemire et al. |
| 8,555,438 B2 | | 10/2013 | Turner et al. |
| 8,799,011 B2 | * | 8/2014 | Wilson et al. ............... 705/2 |
| 8,882,684 B2 | * | 11/2014 | Halperin ............... A61B 5/002 600/300 |
| 2002/0111701 A1 | | 8/2002 | Borders |
| 2002/0152551 A1 | | 10/2002 | Perez et al. |
| 2004/0227737 A1 | | 11/2004 | Novak et al. |
| 2005/0128184 A1 | | 6/2005 | McGreevy |
| 2005/0166324 A1 | | 8/2005 | Dixon et al. |
| 2005/0172405 A1 | * | 8/2005 | Menkedick et al. ............... 5/618 |
| 2005/0273940 A1 | | 12/2005 | Petrosenko et al. |
| 2005/0288571 A1 | | 12/2005 | Perkins et al. |
| 2006/0010601 A1 | * | 1/2006 | Riley et al. ............... 5/600 |
| 2006/0080777 A1 | * | 4/2006 | Rocher et al. ............... 5/618 |
| 2006/0101581 A1 | | 5/2006 | Blanchard et al. |
| 2006/0103636 A1 | | 5/2006 | Parsons |
| 2006/0229557 A1 | | 10/2006 | Fathallah et al. |
| 2006/0277683 A1 | * | 12/2006 | Lamire et al. ............... 5/600 |
| 2007/0066866 A1 | | 3/2007 | Noguchi et al. |
| 2007/0120689 A1 | | 5/2007 | Zerhusen et al. |
| 2007/0163045 A1 | | 7/2007 | Becker et al. |
| 2007/0164871 A1 | | 7/2007 | Dionne et al. |
| 2007/0174964 A1 | | 8/2007 | Lemire et al. |
| 2007/0180616 A1 | | 8/2007 | Newkirk et al. |
| 2007/0296600 A1 | * | 12/2007 | Dixon et al. ............... 340/573.1 |
| 2008/0189865 A1 | * | 8/2008 | Bhai ............... 5/706 |
| 2008/0235872 A1 | | 10/2008 | Newkirk et al. ............... 5/600 |
| 2009/0237264 A1 | * | 9/2009 | Bobey et al. ............... 340/815.69 |
| 2012/0005832 A1 | | 1/2012 | Turner et al. |
| 2012/0079662 A1 | | 4/2012 | Dziobia et al. |
| 2012/0089419 A1 | * | 4/2012 | Huster et al. ............... 705/3 |
| 2012/0096644 A1 | | 4/2012 | Heimbrock |
| 2012/0124744 A1 | | 5/2012 | Hornbach et al. |
| 2012/0144588 A1 | | 6/2012 | Heimbrock et al. |
| 2012/0198627 A1 | * | 8/2012 | Turner et al. ............... 5/610 |
| 2013/0289770 A1 | * | 10/2013 | Rawls-Meehan ............... 700/275 |
| 2013/0340169 A1 | * | 12/2013 | Zerhusen et al. ............... 5/617 |
| 2014/0041119 A1 | * | 2/2014 | Thodupunuri et al. ............... 5/510 |
| 2014/0059770 A1 | * | 3/2014 | Williamson et al. ............... 5/617 |
| 2015/0182400 A1 | * | 7/2015 | Meyer ............... A61G 7/018 5/710 |

FOREIGN PATENT DOCUMENTS

| | | |
|---|---|---|
| WO | WO 2004/021952 A2 | 3/2004 |
| WO | WO 2007/008830 A2 | 1/2007 |
| WO | WO 2007/008831 A2 | 1/2007 |

OTHER PUBLICATIONS

PCT International Search Report for PCT/US2013/046796, dated Jun. 20, 2013, 5 pages.

EP partial supplementary search report for Application No. 13807132.9, dated May 20, 2015 (5 pages).

\* cited by examiner

PATIENT SUPPORT SYSTEMS AND METHODS OF USE

CROSS-REFERENCE TO RELATED APPLICATIONS

The present application claims the benefit, under 35 U.S.C. §119(e), of U.S. Provisional Application No. 61/722,663 which was filed Nov. 5, 2012 and which is hereby incorporated by reference herein. The present application also claims the benefit, under 35 U.S.C. §119(e), of U.S. Provisional Application Nos. 61/662,711, filed Jun. 21, 2012, and 61/663,311, filed Jun. 22, 2012.

BACKGROUND

The present disclosure is related to patient support systems and methods of using patient support systems. Specifically, the present disclosure is related to the patient support systems including user interfaces that communicate information to a user and that receive instructions from the user.

Some modern patient support systems include user interfaces for communicating operational information about the patient support system to a user. Some operational information may be unintelligible for inexperienced users.

SUMMARY

The present application discloses one or more of the features recited in the appended claims and/or the following features which, alone or in any combination, may comprise patentable subject matter:

According to the present disclosure, a patient support system may include a patient support apparatus and a control system. The patient support apparatus may include a base, a deck, and a scale. The deck may include a head-deck section movable relative to the base and a deck sensor configured to detect a head-deck position corresponding to the position of the head-deck section. The scale may be coupled to the deck and configured to detect the weight of a patient supported on the deck. The control system may include a user interface and a controller coupled to the deck sensor, the scale, and the user interface.

In some embodiments, the controller may be configured to display an icon including a first portion that graphically indicates if the head-deck section of the patient support apparatus is in one of a set of predetermined head-deck positions that allow an accurate weight of the patient to be detected by the scale. The icon may graphically indicate which direction the head-deck section should be moved to assume one of the predetermined head-deck positions.

In some embodiments, the deck may include a foot-deck section movable relative to the base. The deck sensor may be configured to detect a foot-deck position corresponding to the position of the foot-deck section. The icon may include a second portion that graphically indicates if the foot-deck section of the patient support apparatus is in one of a set of predetermined foot-deck positions that allow an accurate weight of the patient to be detected by the scale.

In some embodiments, the base may include a lower frame adapted to engage a floor, an upper frame coupled to the deck to support the deck above the floor, and a lift system coupled to the lower frame and to the upper frame. The lift system may be configured to move the upper frame relative to the lower frame. The icon may include a third portion that graphically indicates if the upper frame of the base is in one of a set of predetermined frame positions that allow an accurate weight of the patient to be detected by the scale.

In some embodiments, the icon may include an illustration of the patient support apparatus and a first graphic indicator associated with the head-deck section. The first graphic indicator may be displayed in a first color if the head-deck section is in one of the set of predetermined head-deck positions and may be displayed in a second color if the head-deck section is not in one of the set of predetermined head-deck positions.

In some embodiments, the icon includes a first directional indicator associated with the head-deck section showing a direction to move the head-deck section toward the set of predetermined head-deck positions. The directional indicator may be an arrow.

In some embodiments, the base may include a lower frame adapted to engage a floor, an upper frame coupled to the deck to support the deck above the floor, and a lift system coupled to the lower frame and to the upper frame. The lift system may be configured to move the upper frame relative to the lower frame. The icon may include a second graphic indicator associated with the upper frame and a second directional indicator associated with the upper frame. The second graphic indicator may be displayed in a first color if the upper frame is in one of the set of predetermined frame positions and may be displayed in a second color if the upper frame is not in one of the set of predetermined frame positions. The second directional indicator associated with the upper deck may show a direction to move the upper frame toward the set of predetermined frame positions.

In some embodiments, the deck may include a second deck section movable relative to the base. The deck sensor may be configured to detect a second-deck position corresponding to the position of the second deck section. The icon may include a third graphic indicator associated with the second deck section and a third directional indicator associated with the second deck section. The third graphic indicator may be displayed in a first color if the second deck section is in one of the set of predetermined second-deck positions and may be displayed in a second color if the second deck section is not in one of the set of predetermined second deck positions. The third directional indicator associated with the second deck section may show a direction to move the second deck toward the set of predetermined second deck positions.

According to another aspect of the present disclosure, a patient support system may include a patient support apparatus and a control system. The patient support apparatus may include a base, a deck, and an air source. The deck may include a head-deck section movable relative to the base and a deck sensor configured to detect a head-deck position corresponding to the position of the head-deck section. The air source may be configured to provide pressurized therapeutic air to a patient support surface mounted on the patient support apparatus. The control system may include a user interface and a controller coupled to the deck sensor, the air source, and the user interface.

In some embodiments, the controller may be configured to display an icon graphically indicating if the head-deck section of the patient support apparatus is in one of a set of predetermined head-deck positions that allow a pressurized air therapy to be applied to a patient. The icon may graphically indicate which direction the head-deck section should be moved to assume one of the predetermined head-deck positions.

In some embodiments, the deck may include a foot-deck section movable relative to the base. The deck sensor may be configured to detect a foot-deck position corresponding to the position of the foot-deck section. The icon may graphically indicate if the foot-deck section of the patient support apparatus is in one of a set of predetermined foot-deck positions that allow a pressurized air therapy to be applied to a patient.

In some embodiments, the icon may include an illustration of the patient support apparatus and a first graphic indicator associated with a representation of the head-deck section included in the illustration of the patient support apparatus. The first graphic indicator may be displayed in a first color if the head-deck section is in one of the set of predetermined head-deck positions and may be displayed in a second color if the head-deck section is not in one of the set of predetermined head-deck positions. The graphic indicator may be wedge-shaped and may extend between the representation of the head-deck section and a representation of the base included in the illustration of the patient support apparatus. The icon may include a first directional indicator associated with the representation of the head-deck section showing a direction to move the head-deck section toward the set of predetermined head-deck positions.

In some embodiments, the patient support apparatus may include a siderail movable between a lowered position and a raised position. A siderail portion of the illustration may be displayed in a first color if the siderail is in a predetermined position that allows a pressurized air therapy to be applied to a patient and is displayed in a second color if the siderail is not in the predetermined siderail position.

In some embodiments, the deck may include a second deck section movable relative to the base. The deck sensor may be configured to detect a second-deck position corresponding to the position of the second deck section. The icon may include a second graphic indicator associated with the second deck section and a second directional indicator associated with the second deck section. The second graphic indicator may be displayed in a first color if the second deck section is in one of a set of predetermined second-deck positions that allow a pressurized air therapy to be applied to a patient and may be displayed in a second color if the second deck section is not in one of the set of predetermined second deck positions. The second directional indicator associated with the second deck section may show a direction to move the second deck toward the set of predetermined second deck positions.

According to another aspect of the present disclosure, a patient support system may include a patient support apparatus and a control system. The patient support apparatus having a head end, a foot end, a left side, and a right side. The patient support apparatus may include a lower frame adapted to engage a floor, an upper frame supported over the lower frame, a lift system coupled to the lower frame and to the upper frame, and an obstruction sensor configured to detect obstructions between the lower frame and the upper frame. The control system may include a user interface and a controller coupled to the obstruction sensor, the air source, and the user interface.

In some embodiments, the controller may be configured to display an icon graphically indicating if an obstruction is detected by the obstruction sensor and indicating a location of the obstruction. The icon may include an illustration of the patient support apparatus and a first graphic indicator associated with one of the head end, the foot end, the left side, and the right side of the patient support apparatus.

In some embodiments, the first graphic indicator may be arranged along one of the head end, the foot end, the left side and the right side of the illustration of the patient support apparatus to indicate the location of a first obstruction.

In some embodiments, the icon may include a first directional indicator associated with the first graphic indicator arranged to indicate the location of the obstruction. The directional indicator may be an arrow overlying the first graphic indicator.

In some embodiments, first graphic indicator may be rectangular. The first graphic indicator may be displayed in one of yellow and red.

In some embodiments, the icon may include a second graphic indicator arranged along one of the head end, the foot end, the left side and the right side of the illustration of the patient support apparatus to indicate the location of a second obstruction. The icon may include a first arrow overlying the first graphic indicator and a second arrow overlying the second graphic indicator Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
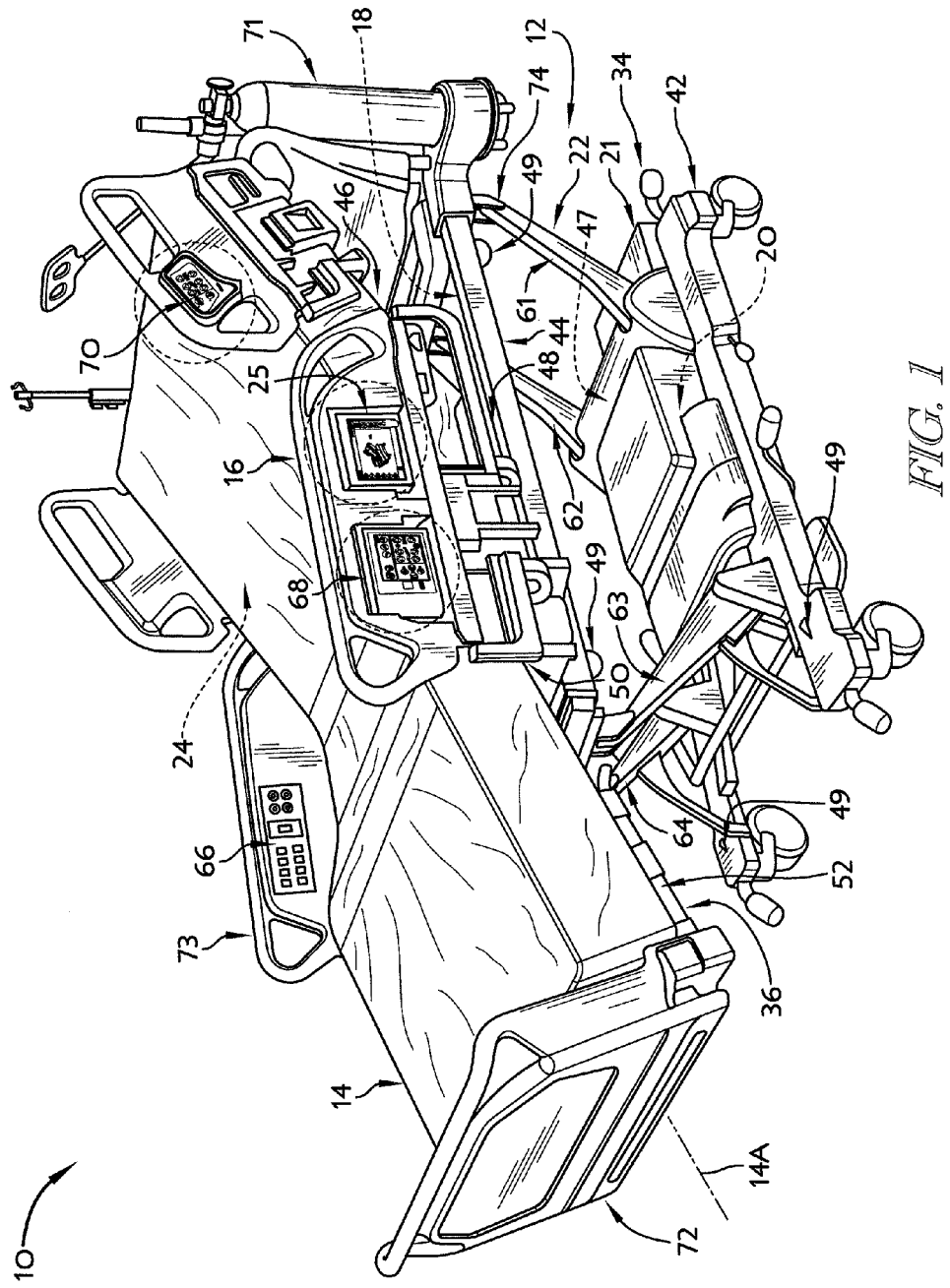
FIG. 1 is a perspective view of a patient support system including a patient support apparatus with a movable deck and a patient support surface mounted on the deck of patient support apparatus.

A patient support system 10 illustratively includes a patient support apparatus (sometimes called a bed frame) 12, a patient support surface (sometimes called a mattress) 14, and a control system 16 integrated into the patient support apparatus 12 as shown in FIG. 1. The patient support apparatus 12 illustratively includes a scale system 18 configured to weigh a patient on the patient support apparatus 12, an air system 20 configured to provide pressurized air to rotation therapy bladders 24 included in the patient support surface 14, and a lift system 22 configured to raise and lower the patient support surface 14 relative to a floor 11 as shown in FIGS. 1 and 2.

Figure 2:
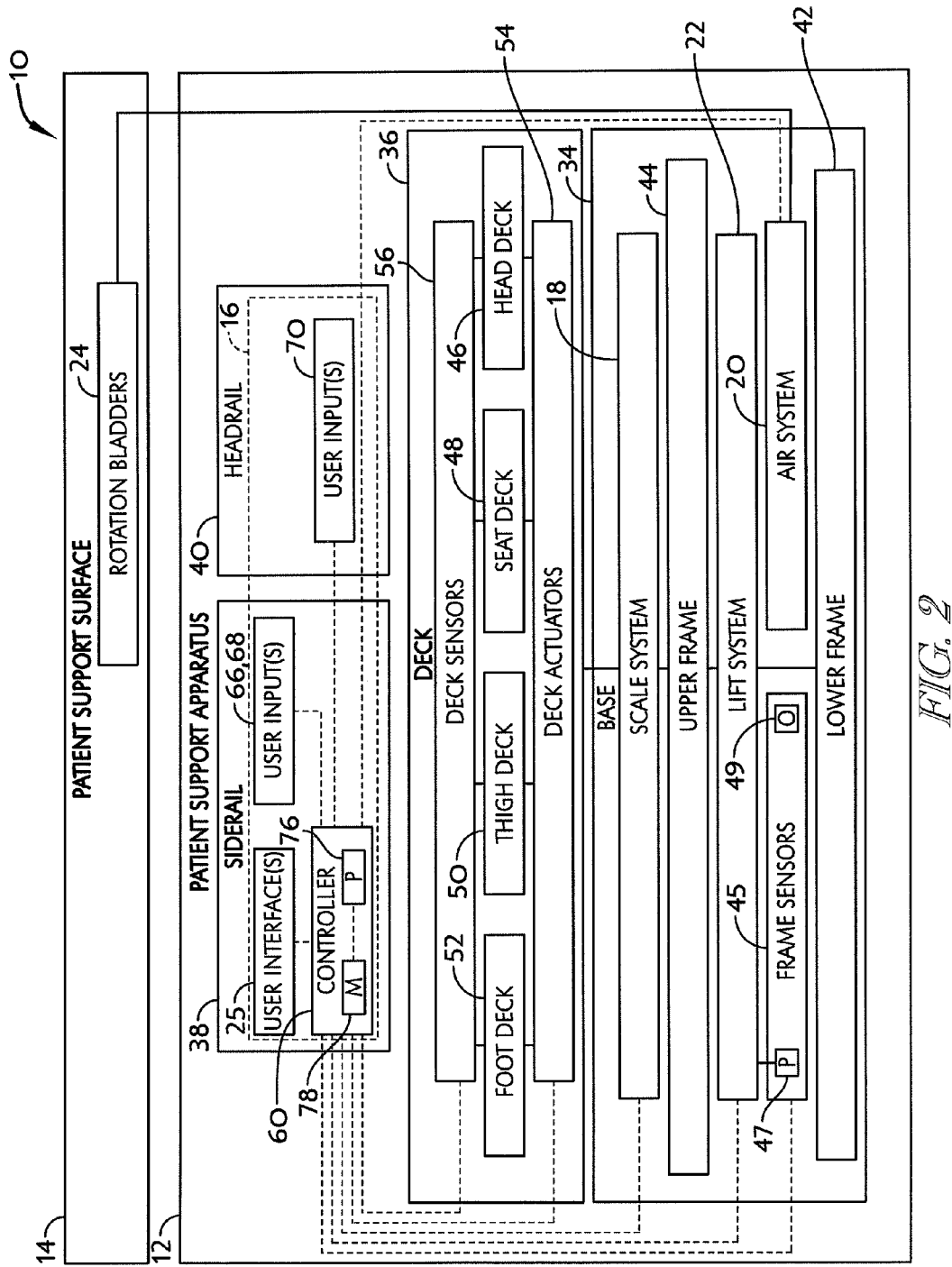
FIG. 2 is a diagrammatic view of the patient support system of FIG. 1 showing that the patient support apparatus includes a scale system, a lift system, and a number of sensors.

The control system 16 is coupled to each of the systems 18, 20, 22 and is coupled to a user interface 25 as shown in FIG. 2. The user interface 25 is illustratively a touch-screen display mounted on a siderail 38 of the patient support apparatus 12 as shown in FIGS. 1 and 2. The control system 16 is configured to display icons on the user interface 25 as suggested in FIGS. 8, 16, and 17-19 to indicate to a user an action that should be taken in order to enable one of the systems 18, 20, 22.

More specifically, the control system 16 displays an icon 241 (shown in FIG. 8) indicating how to rearrange components of the patient support apparatus 12 in order to allow the scale system 18 to take an accurate reading. Also, the control system 16 displays an icon 341 (shown in FIG. 16) indicating how to rearrange components of the patient support apparatus 12 to allow the rotation therapy bladders 24 included in the patient support surface 14 to effectively provide continuous lateral rotation therapy (CLRT). Finally, the control system 16 displays an icon 411 (shown in FIGS. 17-19) indicating which side of the patient support apparatus 12 is blocked by an obstruction that prevents the lift system 22 from lowering the patient support surface 14.

Referring again to FIG. 1, the patient support apparatus 12 includes a base 34 and a deck 36 that support the patient support surface 14 above the floor 11. The base 34 is configured to raise and lower the deck 36 relative to the floor 11 to raise and lower the patient support surface 14 relative to the floor 11. The deck 36 is articulatable and may be reconfigured to support a patient on the patient support surface 14 in a variety of positions, for example in a lie-flat position or a sit-up position (shown in FIG. 1). The patient support apparatus 12 also includes siderails 38 and headrails 40 coupled to the deck 36 to block a patient from accidentally rolling off of the patient support system 10.

The base 34 illustratively includes a lower frame 42 and an upper frame 44 as shown in FIGS. 1 and 2. Additionally, the base 34 includes the scale system 18, the air system 20, the lift system 22, and lift system sensors 45 as shown diagrammatically in FIG. 2. The scale system 18 is illustratively coupled between the upper frame 44 and the deck 36 to weight a patient on the patient support surface 14. The lift system 22 is illustratively coupled between the lower frame 42 and the upper frame 44 to raise and lower the upper frame 44 relative to the lower frame 42. The lift system sensors 21 illustratively include position sensors 47 and obstruction sensors 49 as shown in FIG. 1. The air system 20 is pneumatically coupled to the rotation therapy bladders 24 (along with other inflatable bladders) included in the support surface 14.

The scale system 18 is illustratively made up of load cells coupled between the upper frame 44 and the deck 36 as suggested in FIG. 2. The load cells are configured to detect the weight applied by a patient on the patient support system 10 when the patient support apparatus 12 is in one of a predetermined set of positions. However, the load cells may not be able to detect an accurate weight if the patient support apparatus 12 moved outside the predetermined set of positions. For example, when the patient support apparatus moves to a chair position (not shown) the load cells are unable to accurately detect a patient's weight. For this reason, the control system 16 is configured to indicate to a user trying to use the scale system 18 if the patient support apparatus 12 is out of position and how to move the patient support apparatus 12 to a position in which the scale system 18 can detect patient weight accurately as suggested in FIGS. 5-12.

The air system 20 illustratively includes an air source such as a blower, compressor, or the like housed in the lower frame 42 as suggested in FIG. 1. In operation, the air system 20 provides pressurized air to the rotation therapy bladders 24 to rotate a patient supported on the patient support surface 14 about a longitudinal axis 14A of the patient support surface 14. However, the rotation therapy bladders 24 may not be able to effectively rotate a patient if the patient support apparatus 12 moved outside a predetermined set of positions. For example, when the patient support apparatus moves to a chair position (not shown) the rotation bladders do not underlie a patient and are unable to effectively rotate a patient to provide continuous lateral rotation therapy (rocking a patient back and forth about the axis 14A). For this reason, the control system 16 is configured to indicate to a user trying to use the air system 20 and the rotation therapy bladders 24 if the patient support apparatus 12 is out of position and how to move the patient support apparatus 12 to a position in which the air system 20 and the rotation therapy bladders 24 can effectively rotate a patient as shown in FIGS. 13-16.

Figure 17:
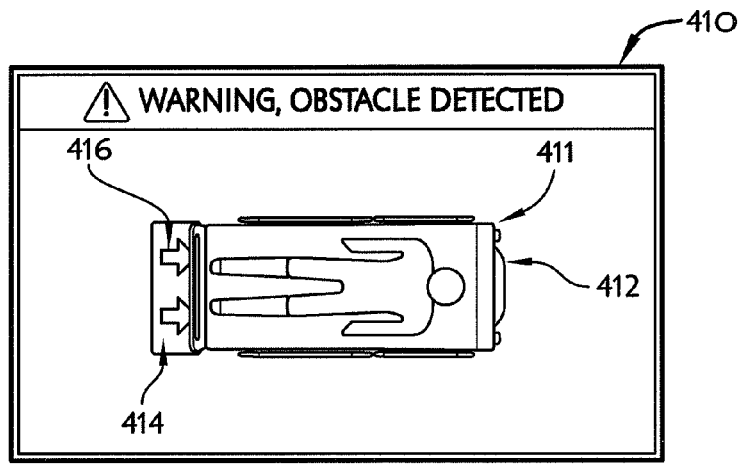
FIG. 17 is a detail view of a first obstacle detection warning screen with an icon indicating that an obstruction is detected between a lower frame and an upper frame of the patient support apparatus along a foot end of the patient support apparatus.
Figure 18:
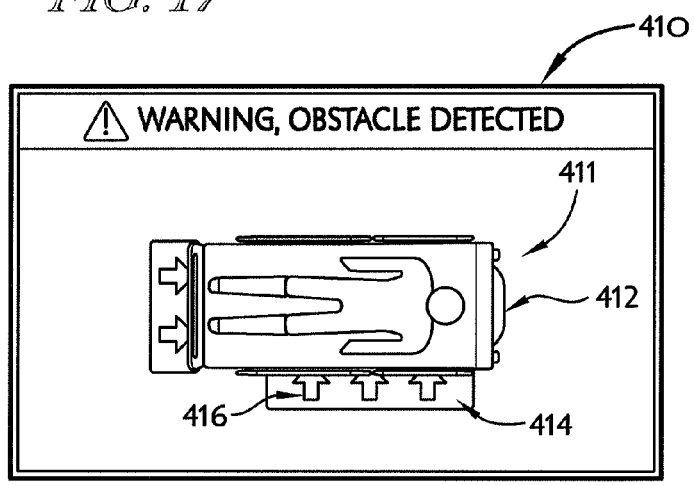
FIG. 18 is a detail view of a second obstacle detection warning screen with an icon indicating that an obstruction is detected between the lower frame and the upper frame of the patient support apparatus along a left side of the patient support apparatus.
Figure 19:
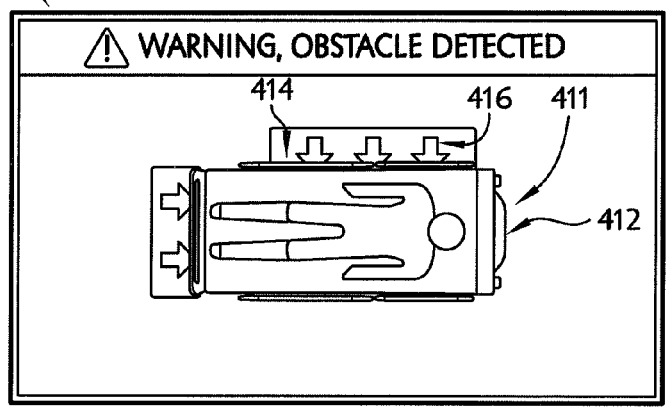
FIG. 19 is a detail view of a third obstacle detection warning screen with an icon indicating that an obstruction is detected between the lower frame and the upper frame of the patient support apparatus along a right side of the patient support apparatus.

The lift system 22 illustratively includes lift arms 61, 62, 63, 64 that pivot relative to the lower frame 42 and the upper frame 44 to raise and lower the upper frame 44 relative to the lower frame 42 as shown in FIG. 1. The obstruction sensors 49 included in the lift system sensors 45 are configured to detect the location of any obstructions present between the lower frame 42 and the upper frame 44. When the obstruction sensors 49 detect an obstruction between the lower frame 42 and the upper frame 44, the control system 16 is configured to disallow any downward movement of the upper frame 44 that might result in a collision with the detected obstruction. The control system 16 is further configured to indicate to a user where the detected obstruction is located relative to the patient support apparatus 12. More specifically, the control system 16 is configured to indicate which side of the patient support apparatus 12 corresponds to the detected obstruction to direct a user to that side for removal of the obstruction as shown in FIGS. 17-19. In the illustrative embodiment, the control system 16 may indicate an obstruction detected along a head end 71, a foot end 72, a left side 73, or a right side 74 of the patient support system 10.

The deck 36 illustratively includes a head-deck section 46, a seat-deck section 48, a thigh-deck section 50, and a foot-deck section 52 as shown in FIGS. 1 and 2. The head-deck section 46 is mounted to the upper frame 44 to pivot about an axis relative to the seat-deck section 48 and to slide relative to the seat-deck section 48 and the upper frame 44 as described in U.S. Publication Nos. US 2010/0122415 A1 and US 2012/0005832 A1, both incorporated by reference herein in their entirety, except as they are inconsistent with the present disclosure. The seat-deck section 48 is coupled to the upper frame 44 to move with the upper frame 44. The thigh-deck section 50 is coupled to the seat-deck section 48 to pivot relative to the seat-deck section 48. The foot-deck section 52 is coupled to the thigh-deck section 50 to pivot relative to the thigh-deck section 50. The foot-deck section 52 is also extendable and retractable to lengthen or shorten the deck 36 as desired by a caregiver or to accommodate repositioning of the deck 36.

In addition to the deck sections, the deck 36 illustratively includes deck actuators 54 and deck sensors 56 as shown diagrammatically in FIG. 2. The deck actuators 54 are coupled to the head-deck section 46, the thigh-deck section 50, and the foot-deck section 52 to move the deck sections 46, 50, 52. The deck actuators 54 are illustratively electric motors, pneumatic pistons, and/or the like. The deck sensors 56 are coupled to each of the deck sections 46, 48, 50, 52 and are configured to determine the position of the deck sections 46, 48, 50, 52.

The control system 16 illustratively includes a controller 60, the user interface 25, and user inputs 66, 68, 70 as shown in FIGS. 1 and 2. The controller 60 is illustratively coupled to the scale system 18, the air system 20, the lift system 22, the user interface 25, the lift system sensors 45, the deck actuators 54, the deck sensors 56, and the user inputs 66, 68, 70 as shown diagrammatically in FIG. 2. The controller 60 includes a processor 76 and a memory 78 coupled to the processor 76. The memory 78 stores instructions to be executed by the processor 76.

Figure 3:
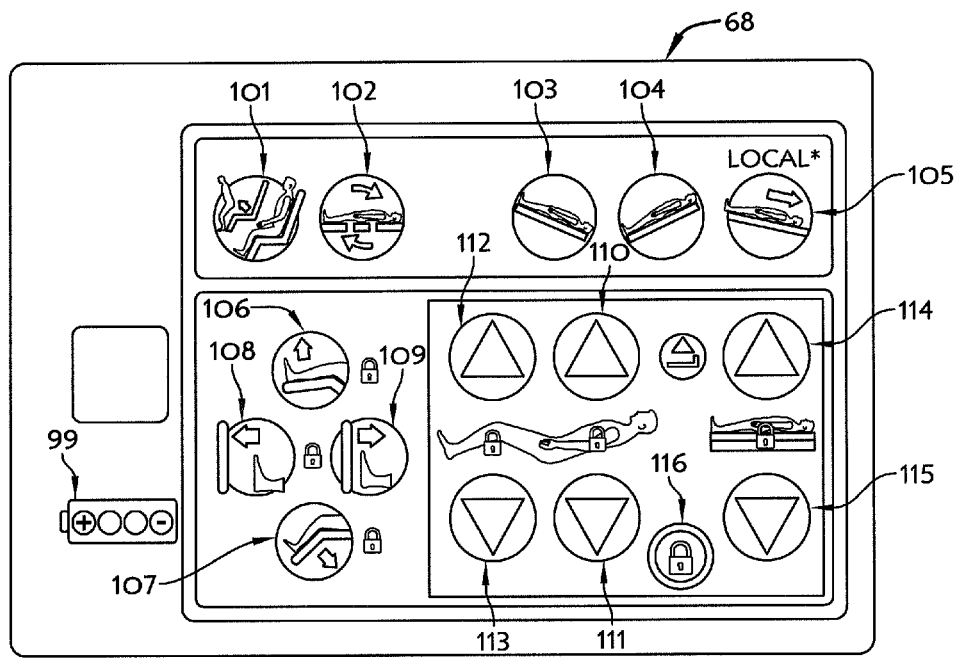
FIG. 3 is a detail view of a first user input included in the patient support apparatus.

Referring now to FIG. 3, the user input 68 includes a battery level indicator 99 and a plurality of buttons 101-116. Buttons 101-116 are operable by a caregiver to reconfigure the patient support apparatus 12 by communicating with the controller 60 to operate the deck actuators 54, the lift system 22, and the air system 20. Specifically, the user input 68 includes the following buttons:

Chair-egress button 101 for reconfiguring the patient support apparatus 12 to a chair-egress configuration, Return-to-flat button 102 for reconfiguring the patient support apparatus 12 from a non-flat configuration (such as chair-egress) to a flat position, Trendelenberg button 103 for reconfiguring the patient support apparatus 12 to a Trendelenberg configuration, Reverse-Trendelenberg button 104 for reconfiguring the patient support apparatus 12 to a reverse-Trendelenberg configuration, Pull-up-in-bed button 105 for flattening the deck 36 and raising the foot end 72 of the deck 36 above the head end 71 of the deck 36 to assist a caregiver pulling a patient up in the patient support apparatus 12, Foot-raise button 106 for raising the foot-deck section 52 as suggested by the icon on the foot-raise button 106, Foot-lower button 107 for lowering the foot-deck section 52 as suggested by the icon on the foot-lower button 107, Foot-extend button 108 for extending the foot-deck section 52, Foot-retract button 109 for retracting the foot-deck section 52, Head-deck incline button 110 for increasing the incline of the head-deck section 46 by pivoting the head-deck section 46 relative to the seat-deck section 48 and sliding the head-deck section 46 relative to the seat-deck section 48 and the upper frame 44, Head-deck decline button 111 for decreasing the incline of the head-deck section 46, Thigh-deck incline button 112 for increasing the incline of the thigh-deck section 50, Thigh-deck decline button 113 for decreasing the incline of the thigh-deck section 50, Upper-frame raise button 114 for lifting the upper frame 44 relative to the lower frame 42, Upper-frame lower button 115 for lowering the upper frame 44 relative to the lower frame 42, and Unlock button 116 for activating the functions of buttons 101-115 in response to holding down unlock button 116 to prevent unwanted activation of buttons 101-113.

Figure 4:
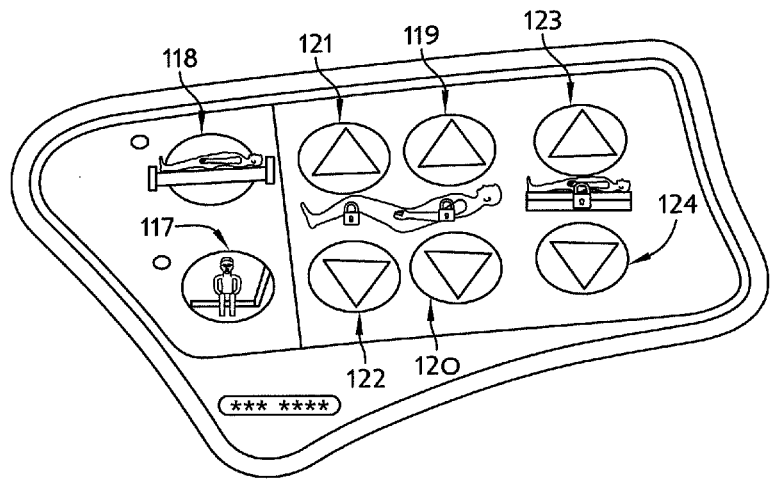
FIG. 4 is a detail view of a second user input included in the patient support apparatus.

Referring to FIG. 4, the user input 70 includes a plurality of buttons 117-124. Buttons 117-124 are operable by a caregiver to reconfigure the patient support apparatus 12 by communicating with the controller 60 to operate the deck actuators 54, the lift system 22, and the air system 20. Specifically, the user input 70 includes the following buttons:

Side-egress button 117 for reconfiguring the patient support apparatus 12 to a side-egress configuration, Return-to-rest button 118 for returning the patient support apparatus 12 to a resting configuration from the side-egress configuration, Head-deck incline button 119 for increasing the incline of the head-deck section 46 by pivoting the head-deck section 46 relative to the seat-deck section 48 and sliding the head-deck section 46 relative to the seat-deck section 48 and the upper frame 44, Head-deck decline button 120 for decreasing the incline of the head-deck section 46, Thigh-deck incline button 121 for increasing the incline of the thigh-deck section 50, Thigh-deck decline button 122 for decreasing the incline of the thigh-deck section 50, Upper-frame raise button 123 for lifting the upper frame 44 relative to the lower frame 42, and Upper-frame lower button 124 for lowering the upper frame 44 relative to the lower frame 42.

Figure 5:
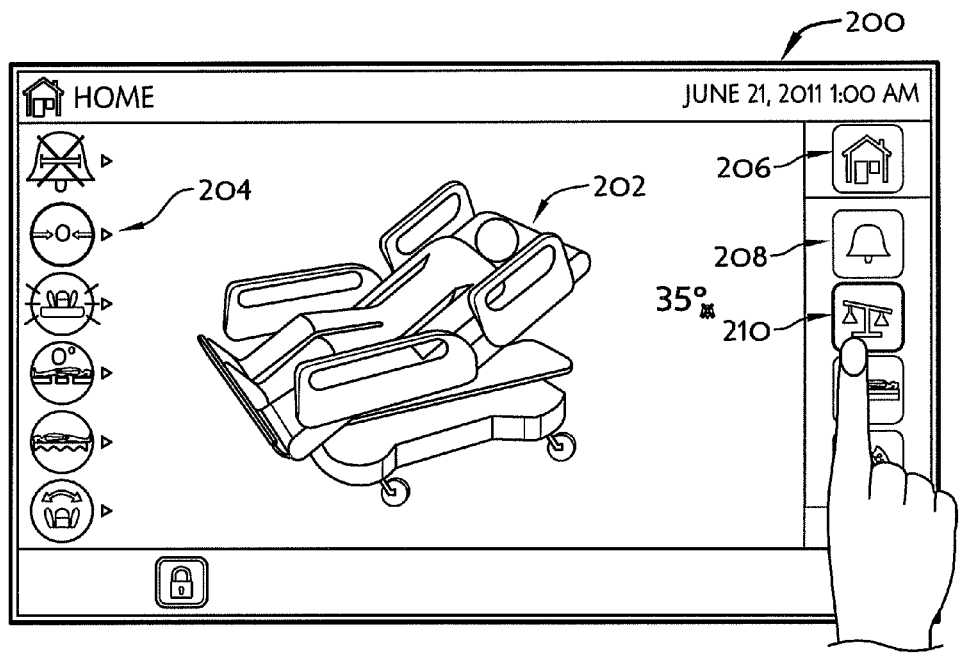
FIG. 5 is a detail view of a home screen that is displayed on a user interface included in the patient support apparatus showing a user selecting a scale system icon included in the home screen.
Figure 6:
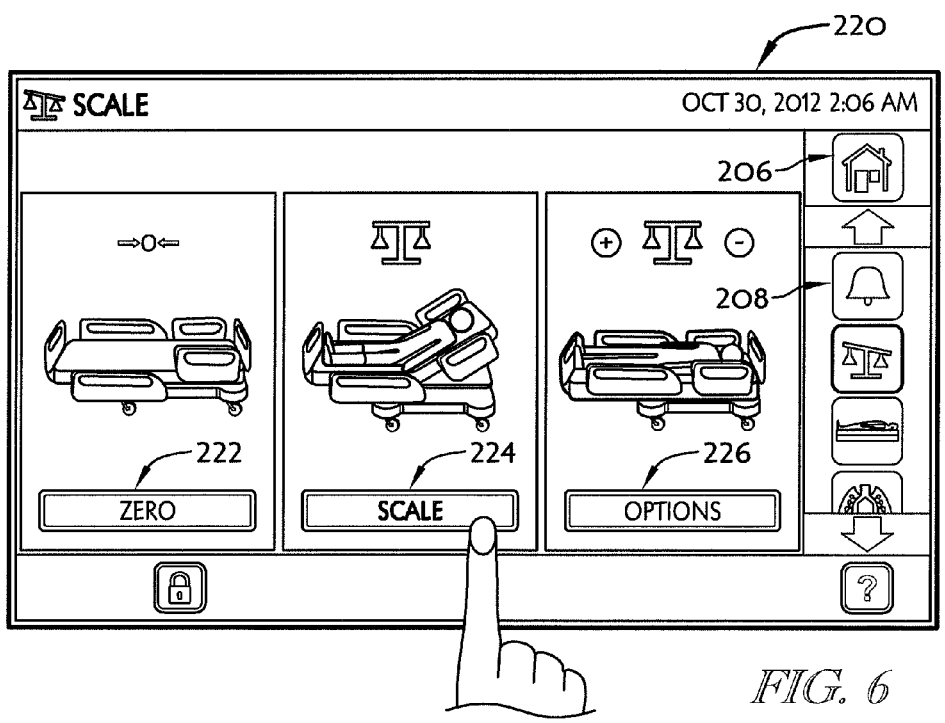
FIG. 6 is a detail view of a main scale screen.

Referring now to FIGS. 5-12, screens associated with a user operating the scale system 18 are shown. In FIG. 5, a home screen 200 that is displayed by the control system 16 on the user interface 25 is shown. The home screen 200 includes an icon 202 showing a dynamic representation of the patient support system 10, a plurality of alert icons 204, a home button 206, and a menu of selectable screen buttons 208. The dynamic representation 202 of the patient support system 10 is adjusted to show the condition of the system 10 including the head-angle of the head-deck section 46, operations of the support surface 14, and any therapies being applied by the support surface 14. The alert icons 204 are each indicative of a different piece of information about the system 10 and may be pressed to move to an expanded alert screen corresponding to the alert icon. The home button 206 may be pressed on any screen to return to the home screen 200. The menu of selectable screen buttons 208 may be selected to change screens, rotated by pressing arrows above and below the menu, or rotated by flicking or swiping upwardly or downwardly on the menu to expose additional screen buttons.

To begin operation of the scale system a user presses a scale button 210 included in the menu 208 as suggested in FIG. 5. Pressing the scale button 210 causes the control system 16 to display a scale screen 220 shown in FIG. 6. On the scale screen 220, a user can select from a zero button 222 configured to zero the scale, a scale button 224 to request that the scale system 18 record a patient weight, or an options button 226 to launch a screen for adjusting the operation of the scale system 18 (e.g. changing from English to metric units). To request that the scale system 18 record a patient weight, a user presses the scale button 224 as suggested in FIG. 6.

If the control system 16 determines that an accurate weight cannot be determined a scale operation screen 230 (shown in FIG. 7) is displayed on the user interface 25, otherwise, a first reminder screen 250 (shown in FIG. 10) is displayed. An accurate may not be able to be determined either because the patient support apparatus 12 is not in one of a set of a predetermined positions or because a patient is moving.

Figure 7:
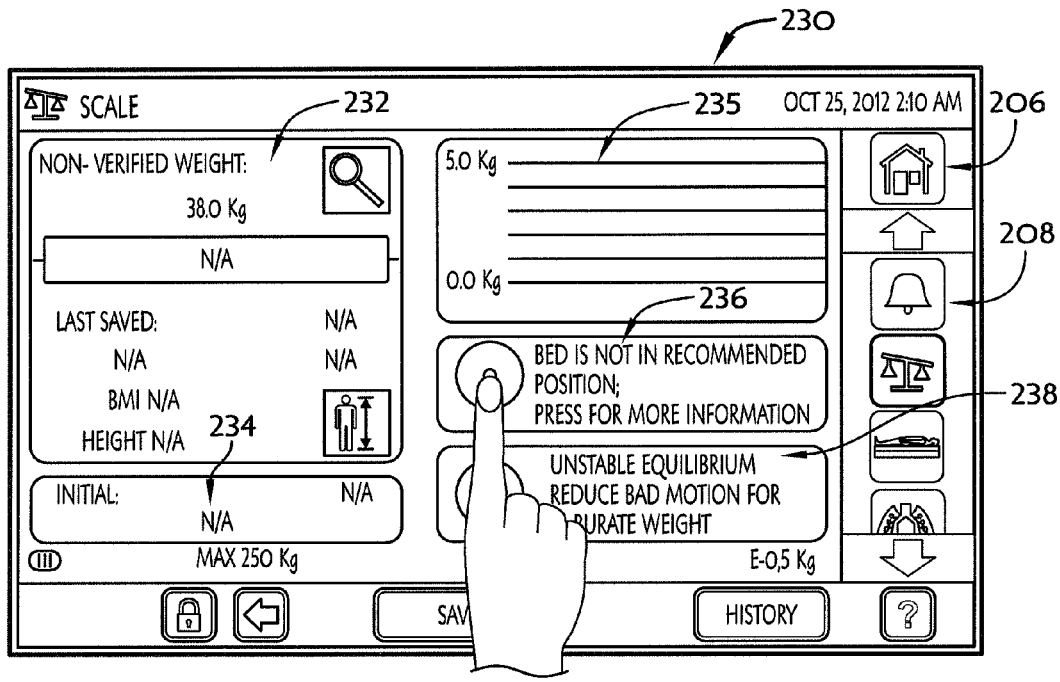
FIG. 7 is a detail view of a scale operation screen indicating that the patient support apparatus is not properly configured to detect an accurate weight of a patient on the patient support system.

The scale operation screen 230 includes a non-verified weight display 232 showing the information available (even though the weight detected may not be accurate), an initial weight display 234, and a weight trend display 235 as shown in FIG. 7. Sometimes, the scale operation screen 230 includes an out of position warning display 236 (if the patient support apparatus 12 is not in one of the set of the predetermined positions approved for scale operation) and an unstable warning display 238 (if the patient is moving).

If a user presses a displayed out of position warning display 236, as suggested in FIG. 7, a recommended position screen 240 is displayed on the user interface 25 by the control system 16. The recommended position screen 240 includes a graphic icon 241 that indicates which components of the patient support apparatus 12 are causing the out of position fault and indicates how to rearrange the patient support apparatus 12 to be in one of the predetermined positions that would allow accurate weight measurement. The icon 241 includes an illustration 242 of the patient support system 10, fault indicators 243, 244, 245 showing components that are out of position, and directional indicators 246, 247, 248 showing how to move the components out of position into position to allow an accurate weight to be detected.

The fault indicators 243, 244, 245 are illustratively a head-section indicator 243, a foot-section indicator 244, and an upper-frame indicator 245 that are displayed in yellow to indicate that a corresponding component 46, 52, 44 is out of position as shown in FIG. 7. When the components 46, 52, 44 are in a predetermined position that allows accurate weighing of a patient, the corresponding fault indicator 243, 244, 245 turns green as shown in FIG. 9.

Figure 8:
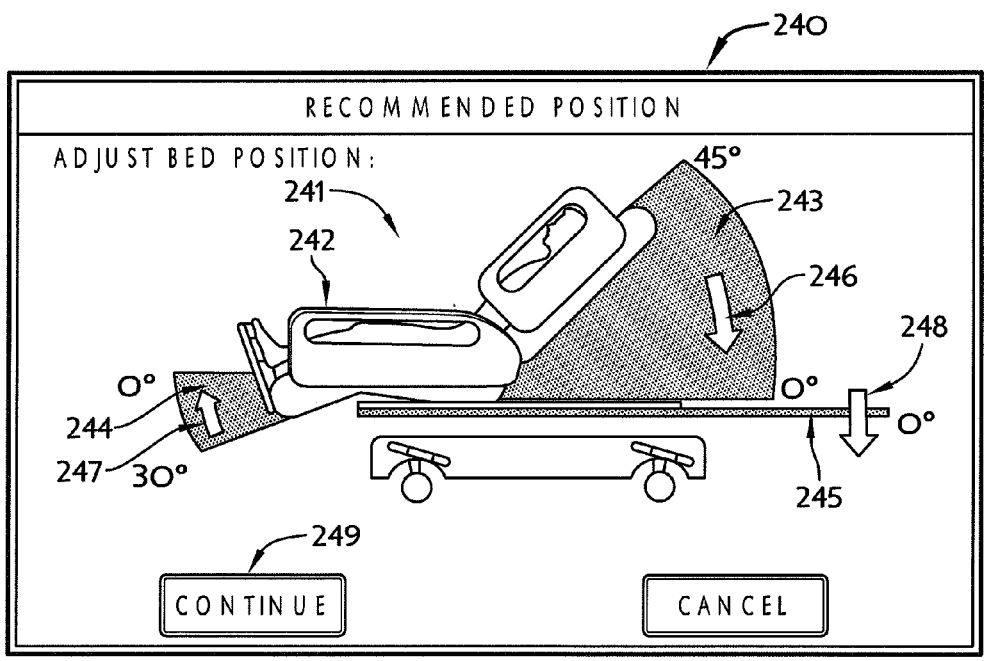
FIG. 8 is a detail view of a first recommended position screen including an icon that indicates how to move components of the patient support apparatus so that the patient support apparatus is properly configured to detect an accurate weight of a patient on the patient support system.

The directional indicators 246, 247, 248 are illustratively a head-section arrow 246, a foot-section arrow 247, and an upper-frame arrow 248 as shown in FIG. 8. Each arrow 246, 247, 248 indicates which direction to move the corresponding component 46, 52, 44 in order to get the component 46, 52, 44 into one of the predetermined set of positions that will allow the scale system 18 to detect an accurate weight. When the components 46, 52, 44 are in a predetermined position that allows accurate weighing of a patient, the corresponding directional indicator 246, 247, 248 disappears as shown in FIG. 9.

Figure 9:
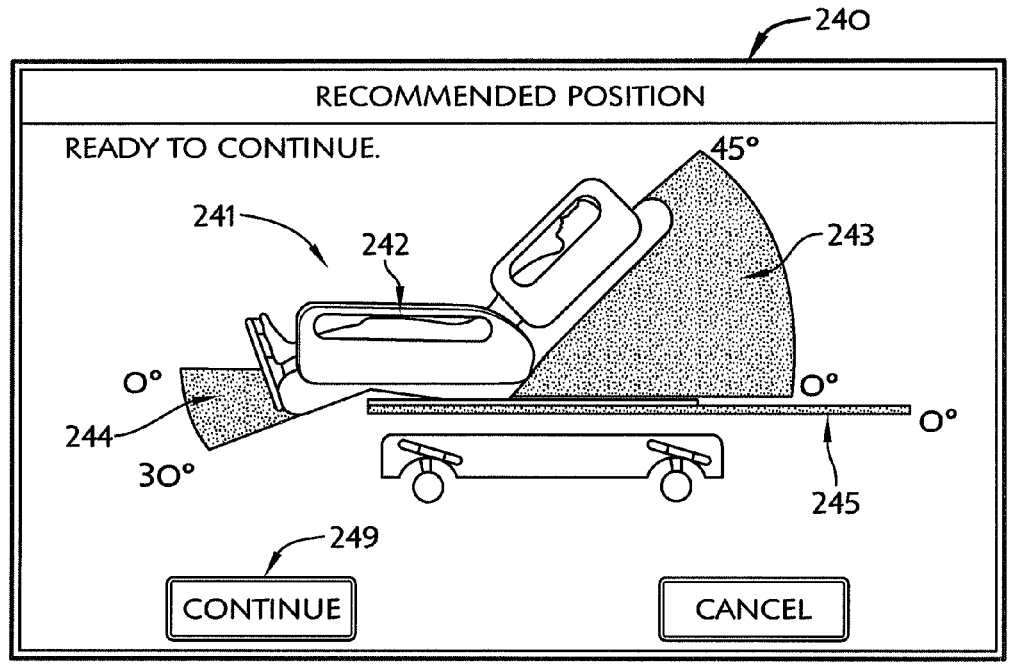
FIG. 9 is a detail view of a second recommended position screen including an icon indicating that the patient support apparatus is properly configured to detect an accurate weight of a patient on the patient support system.

Turning now to FIG. 9, when the patient support apparatus 12 is moved to a position that will allow an accurate weight to be detected, the fault indicators 243, 244, 245 turn green and the directional indicators 246, 247, 248 are removed from the icon 241. A user can then press a continue button 249 to display the first reminder screen 250 shown in FIG. 10.

Figure 10:
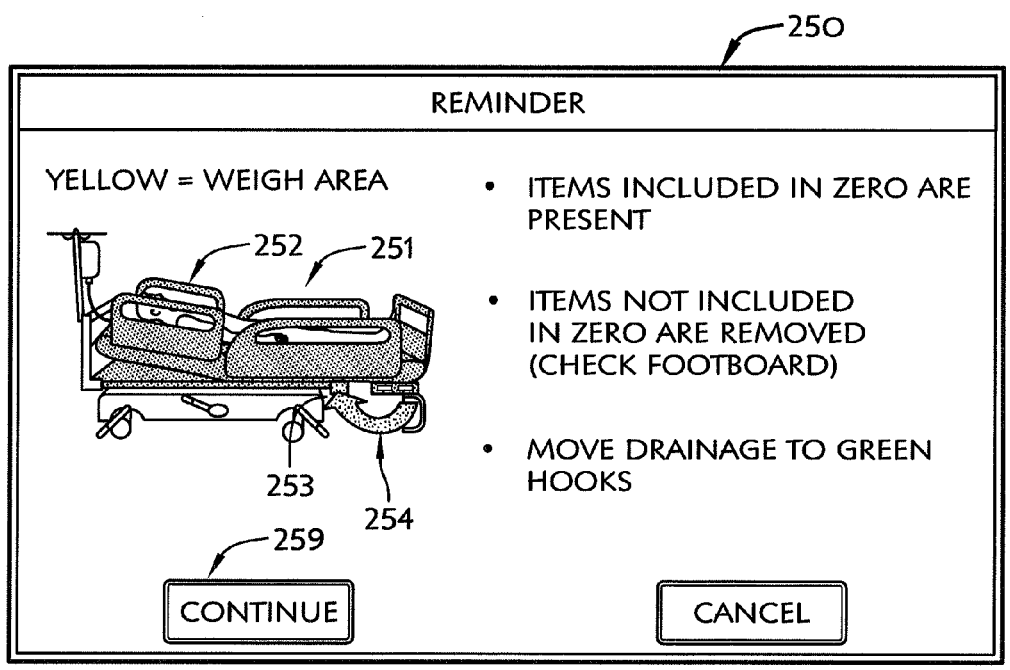
FIG. 10 is a detail view of a first reminder screen including an icon and text indicating that items coupled to the deck of the patient support apparatus should be moved prior to recording the weight of a patient on the deck.

The first reminder screen 250 includes an icon 251 that shows which portions of the patient support system 10 should not be supporting items not supported when the scale system 18 was last zeroed as shown in FIG. 10. The icon 251 includes an illustration 252 of the patient support system 10 with the deck 36, the siderails 38, and the headrails 40 in yellow to indicate that these components will be weighed with the patient. The illustration 252 also includes a green hook 253 shown coupled to the upper frame 44 of the patient support apparatus 12. The icon 251 further includes an arrow 254 suggesting that drainage bags (not shown) hung on the yellow components be moved to the green hook 253. A user can then press a continue button 259 to display a new weight screen 260 shown in FIG. 11.

Figure 11:
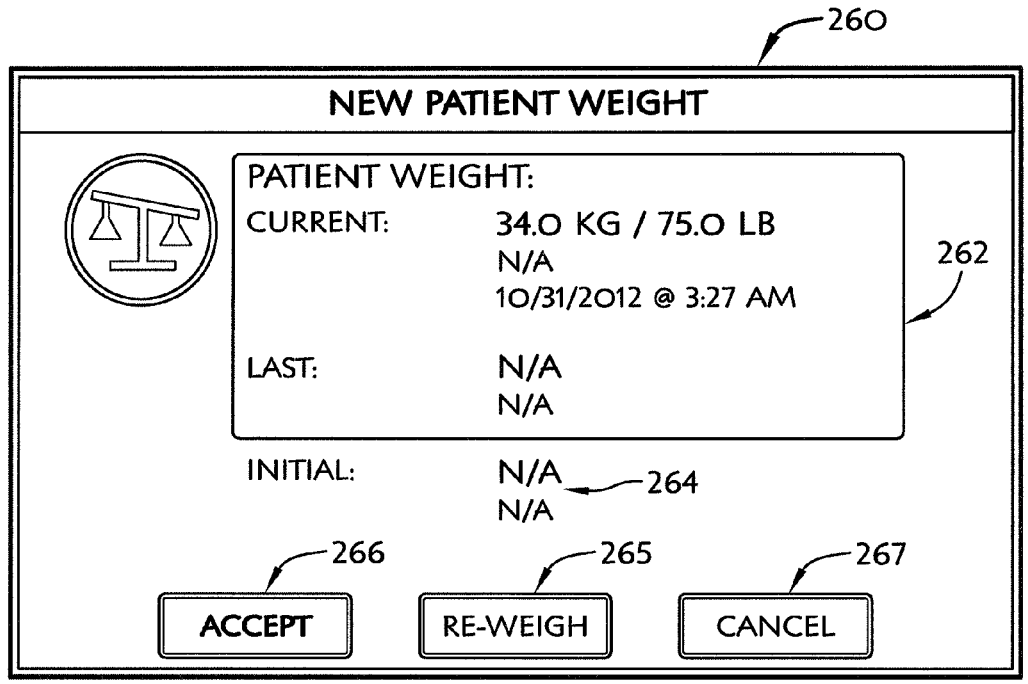
FIG. 11 is a detail view of a new patient weight screen showing a recorded patient weight.
Figure 12:
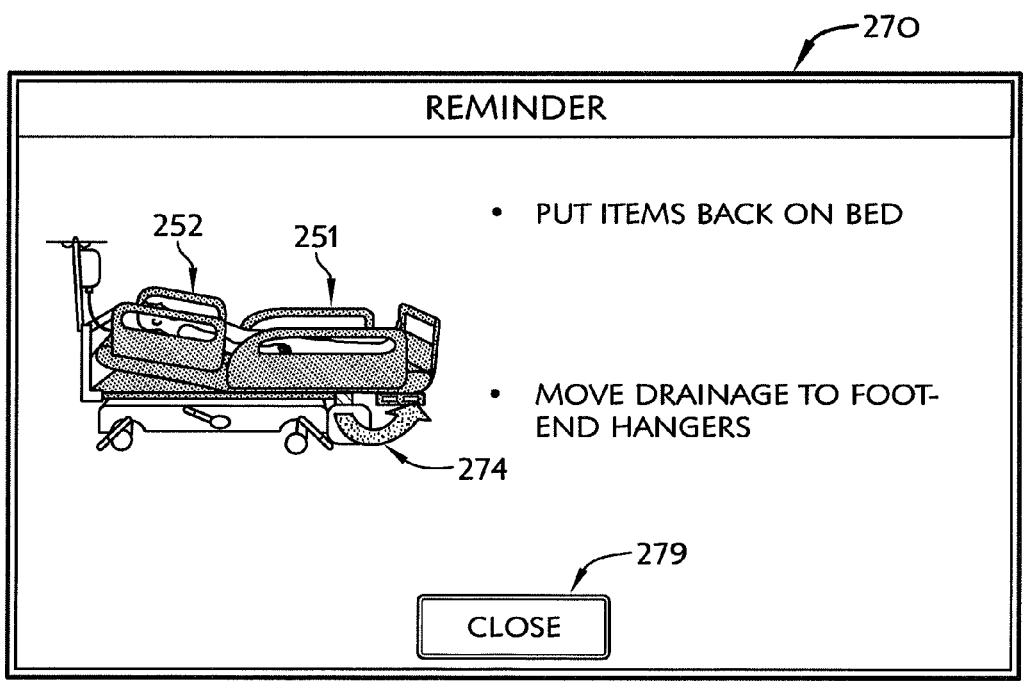
FIG. 12 is a detail view of a second reminder screen including an icon and text indicating that items moved from the deck prior to recording the weight of a patient on the deck can be replaced.

The new weight screen 260 includes a weight display 262 and an initial weight display 264 as shown in FIG. 11. A user can reweigh the patient using a reweigh button 265 or cancel recording of the patient weight using a cancel button 267. If a user is satisfied with the current weight detected and recorded by the scale system 18, the user can press an accept button 266 to display a second reminder screen 270 as shown in FIG. 12. The second reminder screen 270 is similar to the first reminder screen 250 but suggests that the user put items back on the deck 36 and moves drainage bags back to deck hooks via an arrow 274. The user can then press a close button 279 to return to the home screen 200.

Figure 13:
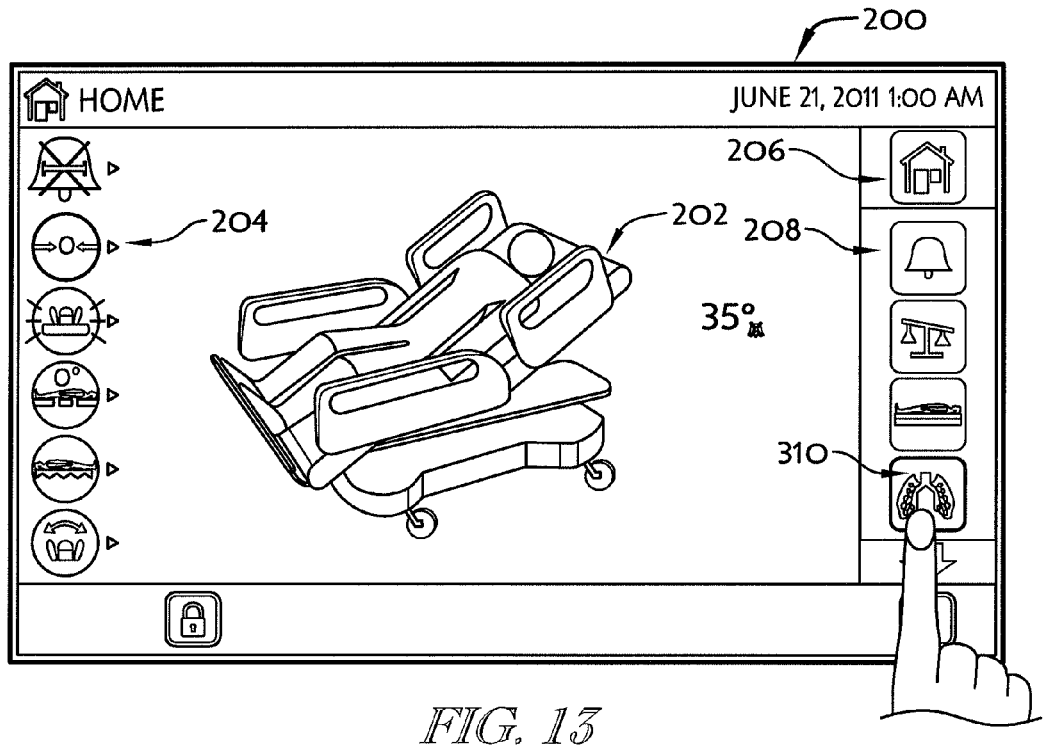
FIG. 13 is a detail view of the home screen showing a user selecting a therapy system icon.
Figure 14:
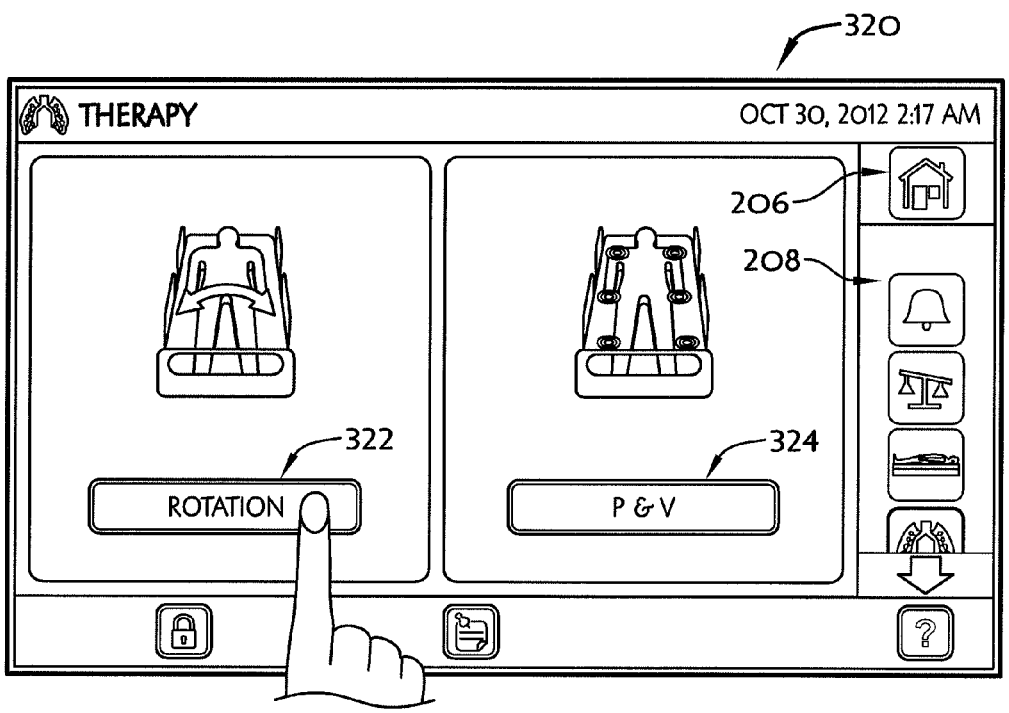
FIG. 14 is a detail view of main therapy screen.
Figure 15:
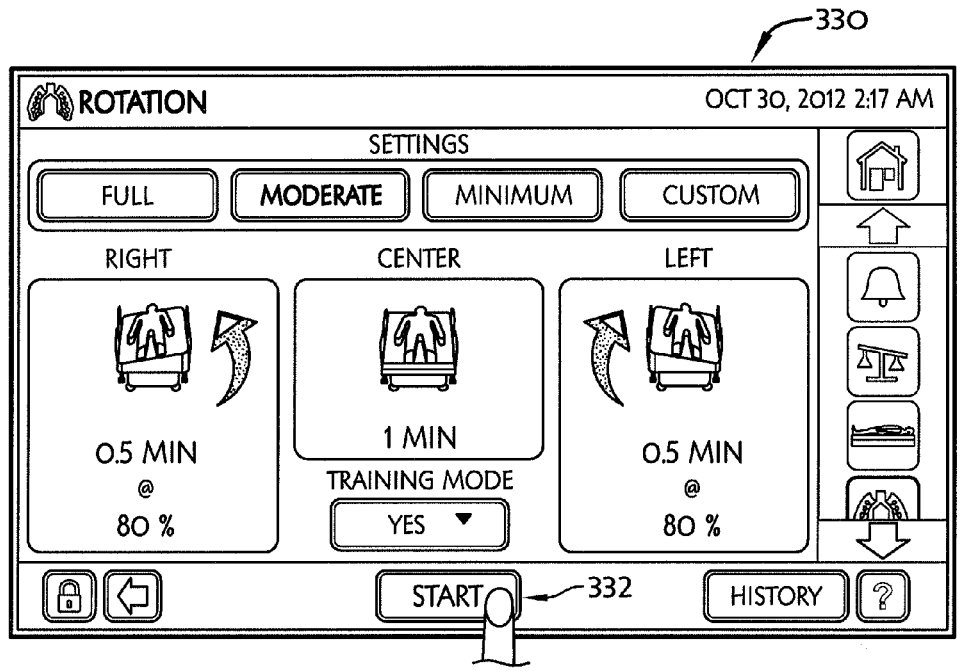
FIG. 15 is a detail view of rotation therapy screen.

Referring now to FIGS. 13-16, screens associated with a user operating the air system 20 and rotation bladders 24 to provide continuous lateral rotation therapy is shown. In FIG. 13, the home screen 200 is shown with a user pressing a pulmonary therapy button 310 included in the menu 208. Once the pulmonary therapy button 310 is pressed, the control system 16 displays a main therapy screen 320 on the user interface 25 as shown in FIG. 14. The main therapy screen includes a rotation button 322 and a percussion and vibration therapy button 324 as shown in FIG. 14. A user pressing the rotation button 322 will advance to a rotation therapy screen 330 as shown in FIG. 15.

On the rotation therapy screen 330, a user can adjust the rate, magnitude of the rotation, and duration of therapy that will be applied to a patient as suggested in FIG. 15. Once a set of parameters are selected, a user can press a start button 332 to begin continuous lateral rotation therapy. However, if the patient support apparatus is not in one of a set of predetermined positions in which the rotation bladders 24 are arranged to properly rotate a patient, a could not start CLRT screen 340 will be displayed on the user interface 25 as shown in FIG. 16.

The could not start CLRT screen 340 illustratively includes a graphic icon 341 that indicates which components of the patient support apparatus 12 are causing the out of position fault and indicates how to rearrange the patient support apparatus 12 to be in one of the predetermined positions that would the therapy to be applied. The icon 341 includes an illustration 342 of the patient support system 10, fault indicators 343, 344, 345 showing components that are out of position, and directional indicators 346, 347, 348 showing how to move the components out of position into position to allow an accurate weight to be detected.

Figure 16:
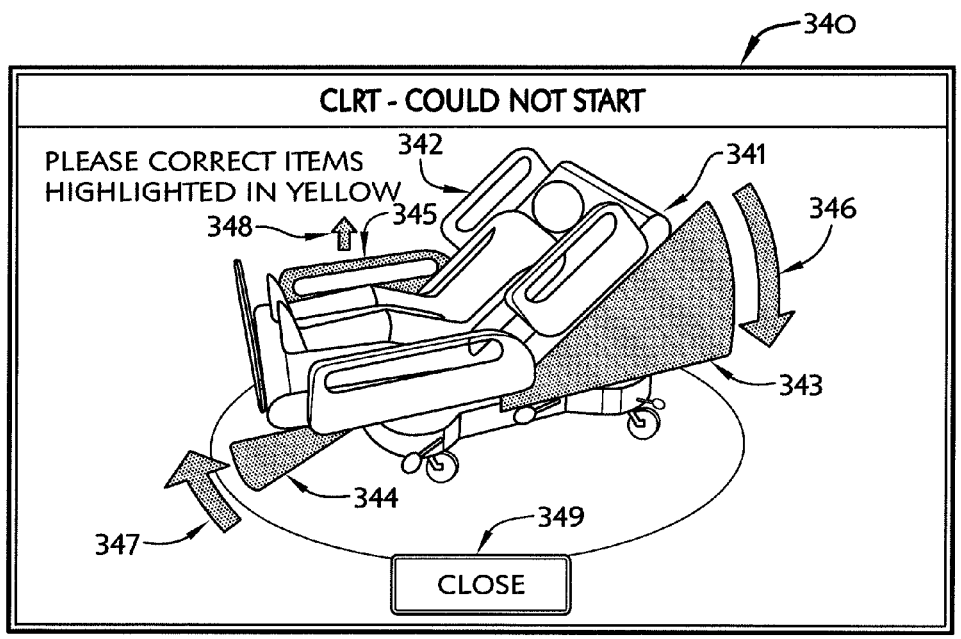
FIG. 16 is a detail view of a could not start CLRT (continuous lateral rotation therapy) screen including an icon indicating that the patient support apparatus is not properly configured to for the application of continuous lateral rotation therapy.

The fault indicators 343, 344, 345 are illustratively a head-section indicator 343, a foot-section indicator 344, and a siderail indicator 345 that are displayed in yellow to indicate that a corresponding component 46, 52, 38 is out of position as shown in FIG. 16. When the components 46, 52, 38 are in a predetermined position that allows effective therapy to be applied, the corresponding fault indicator 343, 344, 345 is no longer colored.

The directional indicators 346, 347, 348 are illustratively a head-section arrow 346, a foot-section arrow 347, and a siderail arrow 348 as shown in FIG. 16. Each arrow 346, 347, 348 indicates which direction to move the corresponding component 46, 52, 38 in order to get the component 46, 52, 38 into one of the predetermined set of positions that will allow therapy to be applied to a patient. When the components 46, 52, 38 are in a predetermined position that allows accurate weighing of a patient, the corresponding directional indicator 346, 347, 348 disappears. Once all indicators are cleared, a user can press a close button 349 to return to the rotation therapy screen 330 to start the therapy.

Referring now to FIGS. 17-19, a set of warning screens 410 are shown that are displayed by the control system 16 on the user interface if an obstruction is detected between the upper frame 44 and the lower frame 42. The warning screens 410 each include an icon 411 with an illustration 412 of the patient support system 10, a fault indicator 414, and a set of arrows 416. The fault indicator 414 of each icon 411 is associated with one of the head end 71, the foot end 72, the left side 73, and the right side 74 of the patient support system 10. A fault indicator 414 is arranged to indicate where obstructions between the lower frame 42 and the upper frame 44 are located so that a user can remove the obstruction to allow the upper frame 44 to be lowered relative to the lower frame 42. The arrows 416 overlie the fault indicators 414 to further indicate where the obstruction is located.

The warning screens 410 are illustratively displayed when a user tries to lower the upper frame 44 toward the lower frame 42 and the obstruction sensor 49 detects an obstruction between the upper frame 44 and the lower frame 42. By indicating to a user where an obstruction is located, the user can quickly clear the obstruction to allow lowering of the upper frame 44. This feature may be helpful when nuisance obstructions such as bed sheets trigger the obstruction sensor 49 and prevent lowering of the upper frame 44.

The invention claimed is:

1. A patient support system comprising
a patient support apparatus including a base, a deck having a head-deck section movable relative to the base and a deck sensor configured to detect a head-deck position corresponding to the position of the head-deck section, and a scale coupled to the deck and configured to detect the weight of a patient supported on the deck, wherein the base includes a lower frame adapted to engage a floor, an upper frame coupled to the deck to support the deck above the floor, and a lift system coupled to the lower frame and to the upper frame, and the deck includes a foot-deck section movable relative to the base and the deck sensor is configured to detect a foot-deck position corresponding to the position of the foot-deck section, and the lift system is configured to move the upper frame relative to the lower frame, and
a control system including a user interface and a controller coupled to the deck sensor, the scale, and the user interface, the controller configured to display an icon including a first portion that graphically indicates if the head-deck section of the patient support apparatus is in one of a set of predetermined head-deck positions that allow an accurate weight of the patient to be detected by the scale, wherein the icon includes a second portion and a third portion, and the second portion graphically indicates if the foot-deck section of the patient support apparatus is in one of a set of predetermined foot-deck positions that allow an accurate weight of the patient to be detected by the scale, and the third portion graphically indicates if the upper frame of the base is in one of a set of predetermined frame positions that allow an accurate weight of the patient to be detected by the scale.

2. The patient support system of claim 1, wherein the icon graphically indicates which direction the head-deck section should be moved to assume one of the predetermined head-deck positions.

3. The patient support system of claim 1, wherein the icon includes an illustration of the patient support apparatus and a first graphic indicator associated with the head-deck section and the first graphic indicator is displayed in a first color if the head-deck section is in one of the set of predetermined head-deck positions and is displayed in a second color if the head-deck section is not in one of the set of predetermined head-deck positions.

4. The patient support system of claim 1, wherein the icon includes a graphic indicator showing components of the patient support system to be weighed, the components to be weighed comprising the deck, siderails, and headrails.

5. The patient support system of claim 4, wherein the graphic indicator is a color and components of the patient support system to be weighed are displayed in the color.

6. The patient support system of claim 4, wherein the icon includes a hook coupled to the upper frame and a directional indicator associated with the components of the patient support system to be weighed, and
the directional indicator shows a direction to move drainage bags off the components of the patient support system to be weighed onto the hook.

7. The patient support system of claim 4, wherein the display includes the graphic indicator and text indicating items coupled to the deck of the patient support apparatus should be moved prior to recording the weight of a patient on the deck.

8. The patient support system of claim 1, wherein the base includes a lower frame adapted to engage a floor, an upper frame supported over the lower frame, a lift system coupled to the lower frame and to the upper frame, and an obstruction sensor configured to detect obstructions between the lower frame and the upper frame, and the controller is configured to display an icon graphically indicating if an obstruction is detected by the obstruction sensor and indicating a location of the obstruction.

9. A patient support system comprising
a patient support apparatus including a base, a deck having a head-deck section movable relative to the base and a deck sensor configured to detect a head-deck position corresponding to the position of the head-deck section, and a scale coupled to the deck and configured to detect the weight of a patient supported on the deck, wherein the base includes a lower frame adapted to engage a floor, an upper frame coupled to the deck to support the deck above the floor, and a lift system coupled to the lower frame and to the upper frame, the lift system being configured to move the upper frame relative to the lower frame, and
a control system including a user interface and a controller coupled to the deck sensor, the scale, and the user interface, the controller configured to display an icon including a first portion that graphically indicates if the head-deck section of the patient support apparatus is in one of a set of predetermined head-deck positions that allow an accurate weight of the patient to be detected by the scale wherein the icon includes an illustration of the patient support apparatus, a first graphic indicator associated with the head-deck section, and a first directional indicator associated with the head-deck section showing a direction to move the head-deck section toward the set of predetermined head-deck positions and the directional indicator is an arrow, and wherein the icon includes a second graphic indicator associated with the upper frame and a second directional indicator associated with the upper frame, the second graphic indicator is displayed in a first color if the upper frame is in one of the set of predetermined frame positions and is displayed in a second color if the upper frame is not in one of the set of predetermined frame positions, and the second directional indicator associated with the upper frame shows a direction to move the upper frame toward the set of predetermined frame positions.

10. The patient support system of claim 9, wherein the deck includes a second deck section movable relative to the base and the deck sensor is configured to detect a second-deck position corresponding to the position of the second deck section, the icon includes a third graphic indicator associated with the second deck section and a third directional indicator associated with the second deck section, the third graphic indicator is displayed in a first color if the second deck section is in one of the set of predetermined second-deck positions and is displayed in a second color if the second deck section is not in one of the set of predetermined second deck positions, and the third directional indicator associated with the second deck section shows a direction to move the second deck toward the set of predetermined second deck positions.

11. A patient support system comprising a patient support apparatus including a base including an upper frame, a deck having a plurality of deck sections movable relative to the base and a deck sensor configured to detect a deck position corresponding to the position of at least one of the plurality of deck sections, and a scale coupled to the deck and configured to detect the weight of a patient supported on the deck, and a control system including a user interface and a controller coupled to the deck sensor, and the user interface, the controller configured to display an icon that graphically indicates a direction that at least one deck section should be moved so that the deck sections of the patient support apparatus are in one of a set of predetermined deck positions that allow an accurate weight of the patient to be detected by the scale, wherein the icon includes a first graphic indicator associated with the upper frame and a first directional indicator associated with the upper frame and the directional indicator associated with the upper frame shows a direction to move the upper frame toward the set of predetermined frame positions.

12. The patient support system of claim 11, wherein the base includes a lower frame adapted to engage a floor and a lift system coupled to the lower frame and to the upper frame, the lift system is configured to move the upper frame relative to the lower frame, the upper frame being coupled to the deck to support the deck above the floor, and the icon graphically indicates if the upper frame of the base is in one of a set of predetermined frame positions that allow an accurate weight of the patient to be detected by the scale.

13. The patient support system of claim 11, wherein the icon includes an illustration of the patient support apparatus and a second graphic indicator associated with at least one of the deck sections.

14. The patient support system of claim 13, wherein the second graphic indicator is displayed in a first color if a corresponding deck section is in one of the set of predetermined deck positions and is displayed in a second color if a corresponding deck section is not in one of the set of predetermined deck positions.

\* \* \* \* \*